United States Patent [19]

Ganz et al.

[11] 4,258,823
[45] Mar. 31, 1981

[54] INFLOW TURBULENCE CONTROL STRUCTURE

[75] Inventors: Ulrich W. Ganz, Kirkland; Paul C. Topness, Renton, both of Wash.

[73] Assignee: The Boeing Company, Seattle, Wash.

[21] Appl. No.: 65

[22] Filed: Jan. 2, 1979

[51] Int. Cl.³ ............................................ F02K 11/00
[52] U.S. Cl. ................................ 181/214; 181/220; 181/222
[58] Field of Search ............... 181/213, 214, 217, 218, 181/222, 220, 229, 284, 286, 292

[56] References Cited

U.S. PATENT DOCUMENTS

| | | | |
|---|---|---|---|
| 2,807,933 | 10/1957 | Martin | 181/214 |
| 3,511,337 | 5/1970 | Pease et al. | 181/214 |
| 3,698,509 | 10/1972 | Fitting et al. | 181/214 |
| 4,168,763 | 9/1979 | White et al. | 181/220 |

Primary Examiner—L. T. Hix
Assistant Examiner—Benjamin R. Fuller
Attorney, Agent, or Firm—Christensen, O'Connor, Johnson & Kindness

[57] ABSTRACT

Disclosed is a turbulence control structure for use during static noise testing of jet aircraft engines. A flow transparent substantially spherical geodesic dome defined by a modified 9-frequency icosahedral frame encloses the intake of a jet engine on a test stand. The surface of the dome is covered by flat flow panels constructed of aluminum honeycomb adhesively bonded to stainless steel perforated sheet. The combination of perforated sheet and honeycomb attenuate streamwise and transverse components of inflow distortions in the intake air entering the engine. As a result, clear inflow is achieved, engine speed is stabilized, and engine intake noise approximating that of in-flight operation are achieved.

12 Claims, 5 Drawing Figures

INFLOW TURBULENCE CONTROL STRUCTURE

BACKGROUND OF THE INVENTION

This invention relates to devices for static noise testing of jet aircraft engines. In particular, it relates to devices for attenuating turbulence in air entering the intake of a jet engine.

The advent of larger jet engines during a time of increasing concern over noise pollution has led to intensified searches for ways to reduce noise emission from jet aircraft engines. The design and development of quieter engines has necessitated extensive static noise testing. To be meaningful, static noise tests must be conducted under conditions which accurately reproduce engine noise characteristics as they exist during actual in-flight operation.

It has been found that a primary source of noise emission from turbofan jet engines is associated with the flow of air through the stationary and moving blades of the fan stage. In particular, it is found that the highest noise levels occur at a frequency known as the blade passing frequency, and at the higher harmonic orders thereof. The blade passing frequency may be defined as the arithmetic product obtained by multiplying the rotational speed of the engine, in revolutions per second, by the number of rotating fan blades. The blade passing frequency, as its name implies, is therefore the number of blades passing by any fixed point on the engine nacelle per second.

In practice, it is found that engine noise levels produced at the blade passing frequency and higher order harmonics thereof are ten to twenty decibels higher than noise levels at other frequencies. Thus, it is clear that overall noise reduction can best be achieved by reducing emission of noise at the blade passing frequency and its harmonics. Noise reduction research has, accordingly, focused on this problem.

It is also found, however, that the noise emitted from any particular engine differs according to whether the noise is measured during a static test or during in-flight operation. In fact, a difficulty encountered in attempting to make realistic static noise tests on the ground lies in the fact that such tests are characterized by higher absolute noise levels at the blade passing frequency than those attending in-flight engine operation. This disparity has been particularly acute with respect to high bypass ratio turbofan engines, such as those used on Boeing 747 airplanes. It is known that a significant part of this difference between static and in-flight noise emission is due to steady and unsteady distortions, or turbulence, in the intake air entering the turbofan inlet during static tests. Tests show that atmospheric turbulence is ingested by the turbofan and that the turbulence becomes increasingly anisotropic due to flow contraction as the air approaches the inlet face. In the vicinity of the fan the intensity of the turbulence velocity components transverse to the direction of airflow may be as high as five percent of the mean flow velocity. It is primarily the interaction of the fan rotors with this turbulence which in ground testing produces the abnormal non-representative noise levels at the blade passing frequency and its higher harmonics. Corresponding atmospheric turbulence effects during flight are negligible.

In order to begin to solve the general problem of reducing in-flight aircraft noise levels at the blade passing frequency, it has therefore been found necessary to create experimental conditions during static ground tests which more nearly reproduce the air intake conditions characteristic of in-flight engine operation. Several experimental engine inflow control devices have been constructed in the past with a view toward reducing intake air turbulence. These devices have proven less satisfactory than the present invention for several reasons. First, the devices were mounted on large external support structures that were located at least partially forward of the inlet highlight plane. Such structures distorted the sound emitted through the control surface by reflection and diffraction.

Secondly, the past devices generally were hemispherical in shape, the hemisphere generally capping the engine intake and being closed around the engine by a flat annular baffle extending in a plane normal to the engine axis between the outer surface of the engine intake and the aft edge of the hemisphere. It has been found that such a baffle has a significant effect on the sound pressure field radiating forwards from the engine intake.

Further, the hemispherical shape of the past devices was only crudely approximated by an assemblage of a relatively small number of large, flat flow panels, hence providing relatively sharp dihedral corners where the panels join. These corners create "dead spaces" which were found to distort sound incident upon them. Also, the hemispherical enclosure framework of the earlier models was constructed of rather large frame members which in themselves occupied and obstructed flow through a relatively large percentage of the hemispherical surface area and also adversely distorted the emitted engine sound.

Finally, the dimensions of the honeycomb and of the adjoining perforated sheets used for constructing flow panels in such earlier devices were unnecessarily thick, therefore creating large acoustic dead spaces where individual panels join.

Another problem encountered during static testing of jet engines is engine speed instability due to wind gusts and atmospheric turbulence. Large turbofan engines are sensitive to inflow distortion, the result being fluctuations in the engine speed which are difficult to prevent.

In view of the foregoing, it is the broad purpose and object of the present invention to provide a device which reduces flow distortions in air entering the intake of a jet engine during static tests.

It is also an object of this invention to provide a device which reduces both streamwise and transverse components of inflow turbulence in the air entering jet aircraft engines during static noise tests.

It is a further object of this invention to provide an efficient, lightweight turbulence control device for jet engine noise testing which has no objectionable sound obstructing or reflecting supporting members foward of the intake of the engine, and which requires a minimum support structure rearward of the engine intake.

It is a further object of this invention to provide a turbulence control device, the supporting framework of which occupies or obstructs a minimum surface area normal to the mean airflow at the control surface.

It is a further object of this invention to provide a device, the panels and panel joints of which minimize the reflection and diffraction of emitted engine intake noise.

It is a further object of this invention to provide a device which stabilizes the engine speed of a jet engine during static testing.

SUMMARY OF THE INVENTION

As herein disclosed, the inflow turbulence control structure is in the form of a substantially full spherical geodesic dome which fully encloses and is centered around the axis of the air intake of a jet engine when mounted on a static test stand. In its preferred from the dome is made up of a skeletal framework defining a modified 9-frequency icosahedron, each face of which is defined by frame members and is filled by a flow panel constructed of aluminum honeycomb bonded to a perforated sheet of stainless steel.

The rearward end of the turbulence control structure terminates in a base ring through which the engine intake protrudes during testing. An annular sailcloth seal connects the base ring to the exterior surface of the engine, and a sound absorbent, frustoconically shaped baffle extends radially inwardly from the outer circumference of the base ring to the exterior of the engine intake. In practice, the goemetrical center of the turbulence control structure is located forward of the highlight plane of the engine intake by a distance of approximately one half the radius of the air intake.

The entire dome structure is supported by the base ring, which is cantilevered off a pair of vertical support shafts extending upwardly from a mobile carriage. The structure thus has no supporting members forward of the base ring to reflect or diffract emitted engine sound.

In the disclosed embodiment, two hundred forty-one (241) hexagonal and pentagonal flow panels cover and define the surface of the structure. Each panel consists of an exterior sheet of perforated stainless steel bonded to an interior aluminum honeycomb panel. Each honeycomb panel is 1.5 inches thick and consists of honeycomb cells of ⅜ inch diameter, the cells thereby having a length/diameter ratio of approximately 12. The basic purpose of the aluminum honeycomb is to attenuate transverse components of inflow turbulence in air passing through the honeycomb.

The aluminum honeycomb is adhesively bonded to the perforated stainless steel sheet, which is in turn attached to the geodesic framework. The purpose of the stainless steel sheet, having a fifty percent open area of 1/16 inch diameter holes, is to attenuate streamwise components of inflow turbulence. Together, the perforated stainless steel sheet and the aluminum honeycomb attenuate both streamwise and transverse components of turbulence in the inflowing air without significantly absorbing, diffracting or reflecting engine noise passing therethrough.

In practice, the inflow control structure is positioned around the air intake of a jet engine which is statically mounted near the center of a large concrete apron. Microphones are mounted on the surface of the engine nacelle to measure near-field noise. Arrays of microphones are also placed on the concrete apron at various distances and angles from the engine intake to measure far-field noise levels. Acoustic barriers are placed around the engine exhaust to minimize noise radiation forward from that source.

DESCRIPTION OF THE PREFERRED EMBODIMENT

Figure 1:
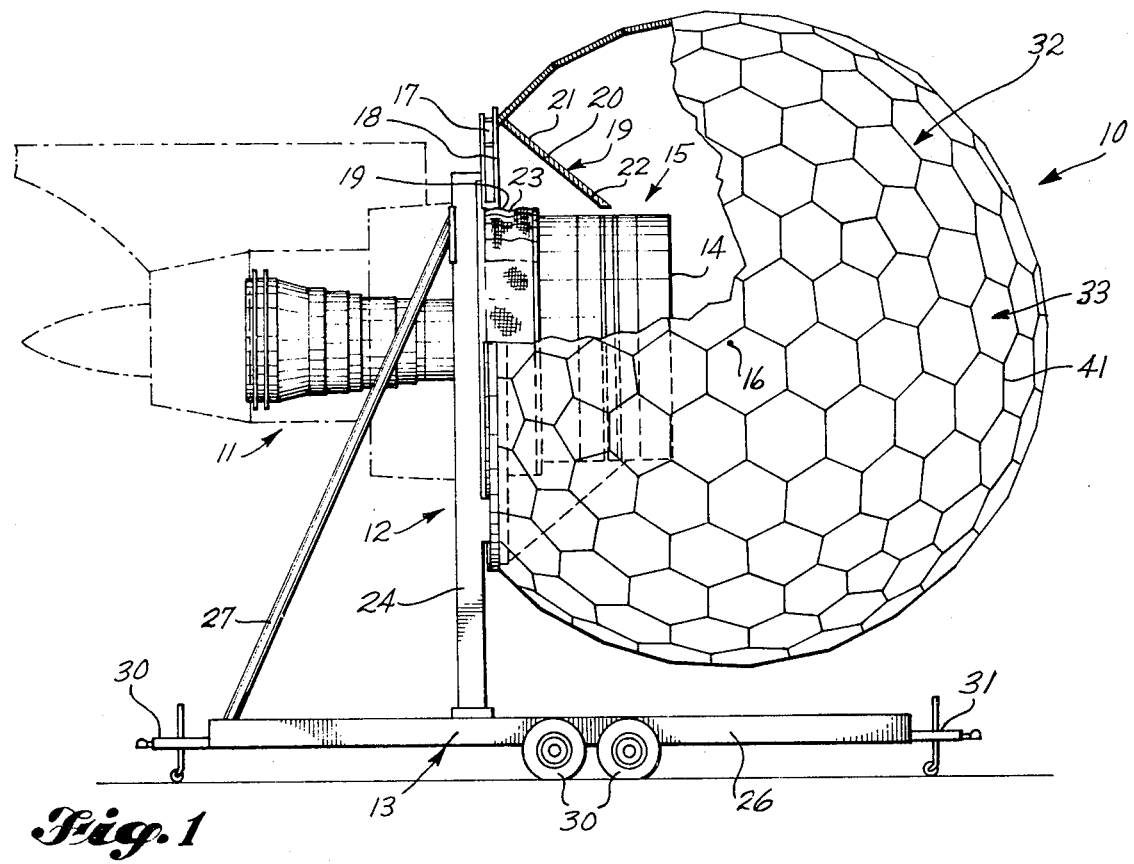
FIG. 1 is a side view of the preferred embodiment of the turbulence control structure mounted on a mobile carriage and enclosing the air intake of a statically mounted turbofan jet engine.
Figure 2:
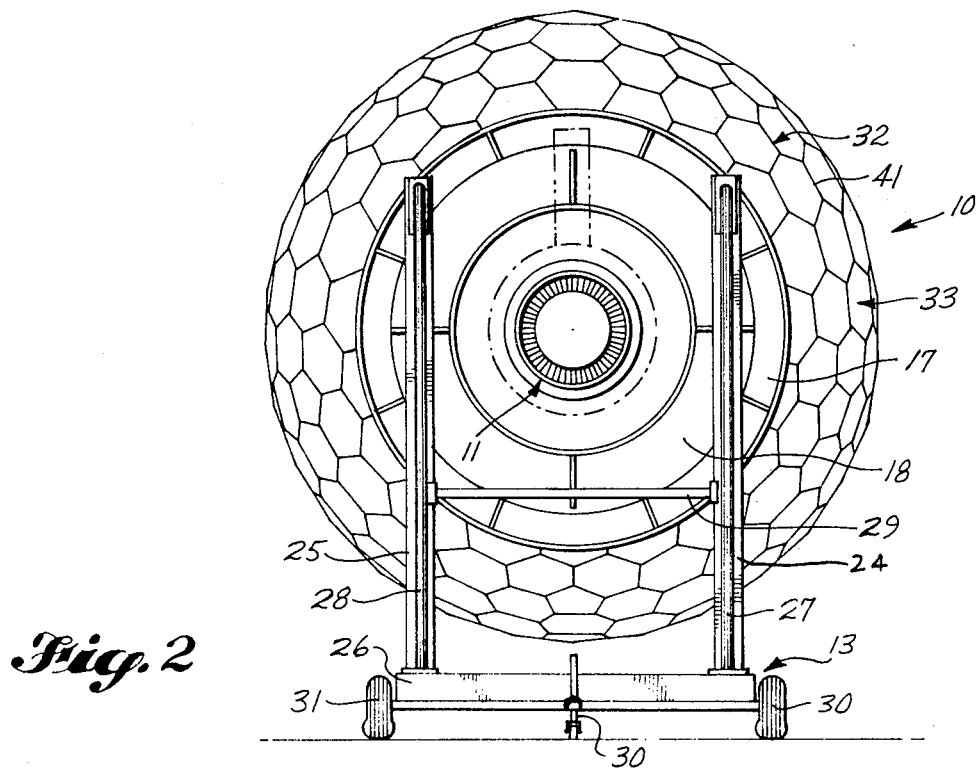
FIG. 2 is a rear view of the turbulence control structure and statically mounted turbofan engine of FIG. 1.

Referring to FIGS. 1 through 5, inclusive, the illustrated and preferred embodiment of the present invention consists of an inflow turbulence control structure 10 having the general shape of a geodesic dome. The turbulence control structure 10 enclosable about the intake end of a statically mounted jet aircraft engine 11 by means of a circular side opening 12 through which the engine may protrude. The turbulence control structure 10 is mounted on a mobile carriage 13 which is used to transport the turbulence control structure 10 and to move it into position about the engine 11.

In practice, the engine 11 is mounted in a horizontal position and supported from above by a static test stand (not shown). The turbulence control structure 10 is moved into a position such that the engine 11 is centered upon and protrudes radially into the turbulence control structure 10. When correctly positioned, the highlight plane 14 of the air intake cowling 15 is spaced from the geometric center of the turbulence control structure 10, designated by point 16, by a distance equal to one-half the radius of the air intake cowling 15.

The diameter of the turbulence control structure 10 is approximately three times the diameter of the air intake cowling 15. In the case of a modern high by-pass turbofan aircraft engine, this diameter may typically be of the order of twenty-four feet. It is found that such a diameter provides a surface area sufficiently large to minimize the pressure drop in inflow air traversing the surface of the turbulence control structure 10, and yet not so large as to allow inflow irregularities to arise due to wind induced pressure differentials between one side of the turbulence control structure 10 and another.

In the preferred embodiment, the circular side opening 12 is of a diameter approximately equal to the radius of the turbulence control structure 10. A base ring 17 circumscribes the circular opening 12 and is secured to the turbulence control structure 10. An annular sheet metal seal ring 18 is secured to the inner periphery of the base ring 17. The seal ring 18 is designed for use with the particular jet engine 11 to be tested and is fabricated so as to have an interior diameter slightly greater than the outer diameter of the engine air intake cowling 15.

A frustoconical baffle 19 extends radially inward from the interior outer circumference of the base ring 17 and terminates in a circular opening which is spaced around the outer circumference of the air intake cowling 15. The baffle 19 consists of a layer of sound absorbent fiberglass batting 20 sandwiched between a forwardly facing interior perforated sheet assembly 21 and a rearwardly facing backplate 22. Also sandwiched between the perforated sheet assembly 21 and the backplate 22 is a layer of fiberglass cloth, not shown, interposed between the perforated sheet assembly 21 and the fiberglass batting 20 for the purpose of preventing fiberglass fibers from passing through the perforated sheet assembly 21 and being sucked into the air intake of the engine 11. The frustoconical configuration of the baffle 19 serves to maintain a radial inward flow of intake air from the aft portions of the turbulence control structure 10 and also minimizes distortion of engine noise emitted from the air intake of the engine 11.

An annular sailcloth seal 23 seals the annular space between the rear portion of the air intake cowling 15 and the inner periphery of the seal ring 18. The sailcloth seal 23 effectively seals the air space between the seal ring 18 and the engine 11 without transmitting engine vibration or movement to the turbulence control structure 10.

The entire turbulence control structure 10 is secured to and supported by the base ring 17, which is in turn supported by a pair of vertical support shafts 24 and 25. Support shafts 24 and 25 extend upwardly from a carriage frame 26 and are sufficiently spaced from one another so as to allow the engine 11 to readily protrude through the circular opening 12. Angled struts 27 and 28 brace support shafts 24 and 25, respectively. A cross member 29 provides lateral support for support shafts 24 and 25.

The mobile carriage frame 26 has a flat, horizontal surface (not shown) to minimize reflection and diffraction of sound towards the far-field microphones. The mobile carriage 13 travels on sets of wheels 30 and 31 and may be towed in either forward or rearward directions by means of trailer hitches 30 and 31.

The turbulence control structure 10 is composed of a substantially spherical geodesic frame 32 having flat, flow straightening panels 33 occupying the polygonal openings thereof. In the preferred and illustrated embodiment, the frame 32 defines a modified 9-frequency icosahedron, further described below, although it will be understood that other substantially spherical geometric structures may be substituted for the particular frame 32 of the preferred embodiment.

Figure 3:
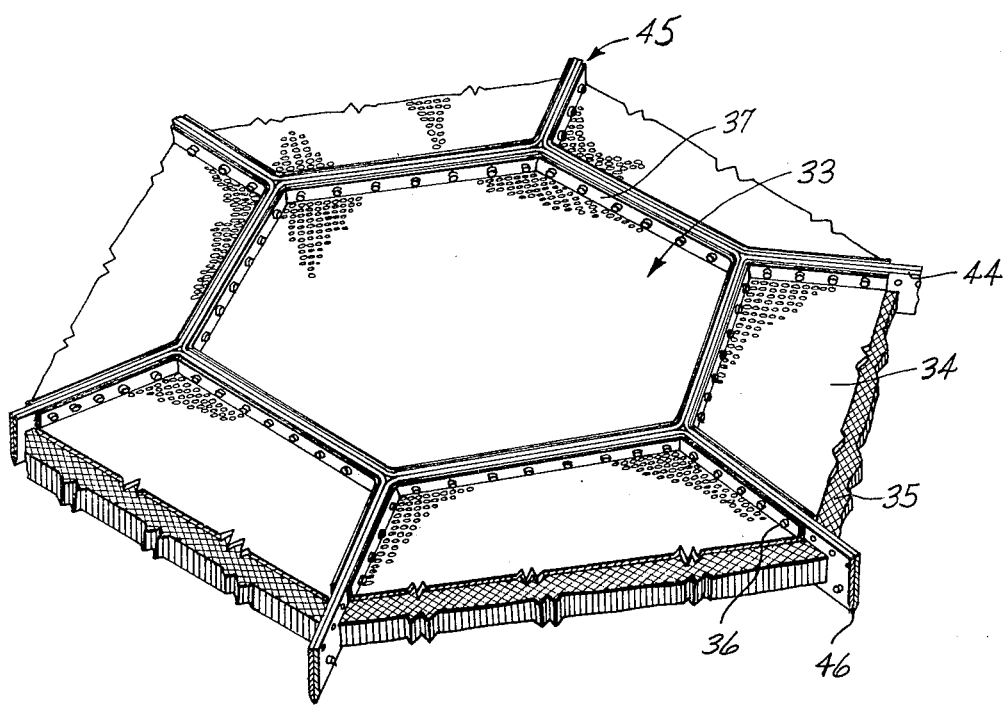
FIG. 3 is a perspective view of a small portion of the turbulence control structure frame and flow panels attached thereto.
Figure 4:
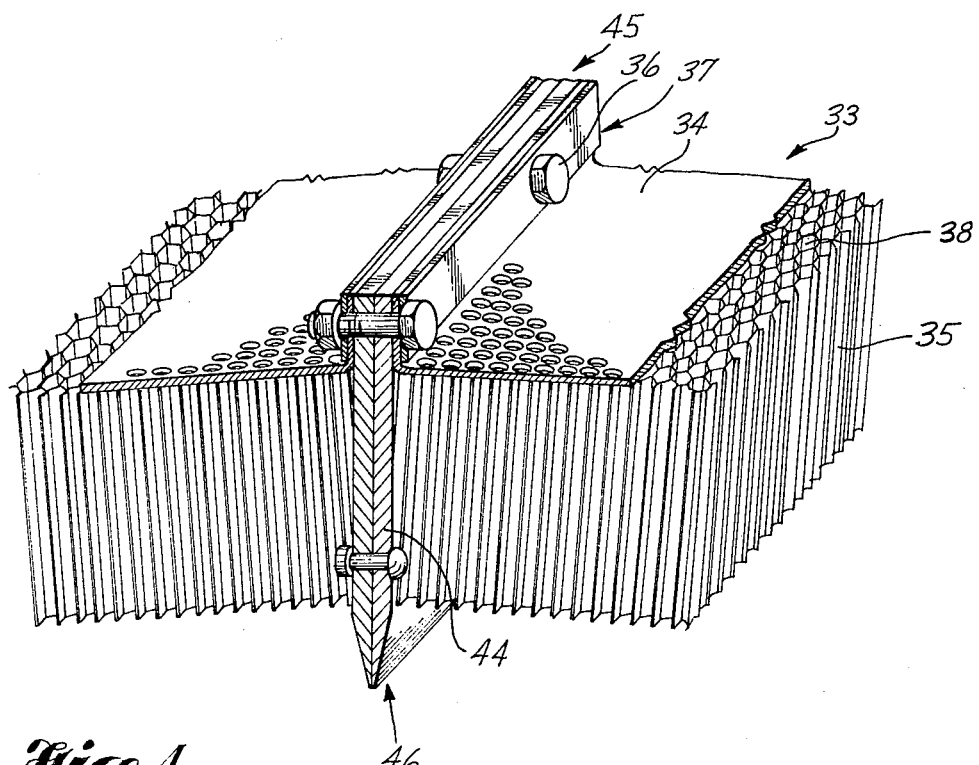
FIG. 4 is a perspective sectional view of two flow panels and a portion of the frame to which they are attached.

Referring to FIGS. 3 and 4, each panel 33 consists of a perforated stainless steel sheet 34 adhesively bonded to a hexagonal aluminum honeycomb panel 35. The perforated sheets 34 form the exterior surface of each panel 33. Each perforated sheet 34 is turned upwards along its outer peripheral edge and affixed to the frame 32 by means of nut and bolt assemblies 36 and a reinforcement strip 37 provided to distribute load uniformly over the upturned edge of the perforated sheet 34. The perforated sheets 34 are formed from 0.031 inch stainless steel sheet punched with one-sixteenth inch holes and having an average percentage of open area equal to approximately fifty percent.

In the preferred embodiment, each aluminum honeycomb panel 35 is 1.5 inches thick and consists of an array of parallel, close-packed, contiguous hexagonal cells 38. Each cell 38 shares a common side wall with each of its six neighboring hexagonal cells. The cross-sectional diameter of each hexagonal cell 38 is one-eighth inch. The length/diameter ratio of each cell 38 is therefore 12/1, a ratio which has been found to provide an acceptable combination of maximum attenuation of transverse eddy turbulence and minimum acoustic absorption.

During fabrication, each aluminum honeycomb panel 35 is cut to conform in outline with the edges of its adjacent perforated sheet 34. The perforated sheet 34 is sandblasted to roughen its surface and then adhesively bonded to the honeycomb panel 35, using a special bonding tool (not shown) for this purpose.

The geodesic frame 32 has the geometric structure defined by a modified 9-frequency icosahedron, which structure is derived as follows. The starting point is a regular icosahedron having twenty faces, each of which has the shape of an equilateral triangle of identical size. (The term "regular" is used herein in its geometric sense to mean a geometric structure wherein all equivalent angles and faces are of equal dimension, such that a regular polyhedron of any class of polyhedrons is the most symmetric polyhedron in that class.) The regular icosahedron has thirty edges defining the face, and twelve vertices, or corners, at which the edges meet. Five edges and five faces intersect at each vertex of the regular icosahedron. Five triangular faces also join at each vertex.

In a regular 9-frequency icosahedron, each triangular face of a regular icosahedron is subdivided into exactly eighty-one identical equilateral triangles, each of which has edge lengths which are exactly 1/9th the edge length of the original triangular face. This subdivision may be accomplished by dividing each edge of an original triangular face into nine equal segments, the ends of corresponding segments on adjacent edges of the triangle then being connected by lines drawn parallel to the edges of the original triangle. This results in a multiplicity of new vertices, at each of which exactly six new edges intersect. The original twelve vertices of the regular icosahedron are preserved, however, and are distinguished from the new vertices by the fact that only five edges intersect at each original icosahedral vertex.

A geodesic dome approximating a sphere is typically modeled after such a multi-frequency icosahedron, the vertices of which are projected onto the surface of an imaginary sphere. As higher frequency icosahedrons are employed, the larger numbers of vertices and faces create a structure more closely approximating the surface of an ideal sphere.

The geometric structure of the preferred embodiment of the present invention is based upon a regular 9-frequency icosahedron, modified by substituting flat hexagonal faces for hexagonal clusters of six triangular faces meeting at a vertex, and also substituting flat pentagonal faces for those clusters of five triangular faces meeting at each of the twelve vertices of the original regular icosahedron. In the final step, the remaining vertices of the modified 9-frequency icosahedron are projected onto the surface of a sphere and the dimensions of the pentagonal and hexagonal surfaces adjusted accordingly. This modification results in a structure which consists entirely of flat pentagonal and flat hexagonal faces, and which yet continues to closely approximate the surface of a sphere. Also, modification of a 9-frequency icosahedron in this manner results in a structure wherein no more than three edge members intersect at any vertex. The advantage of this characteristic is that assembly of the geodesic frame is made simpler and, more importantly, there are fewer edge members to block or reflect sound.

Figure 5:
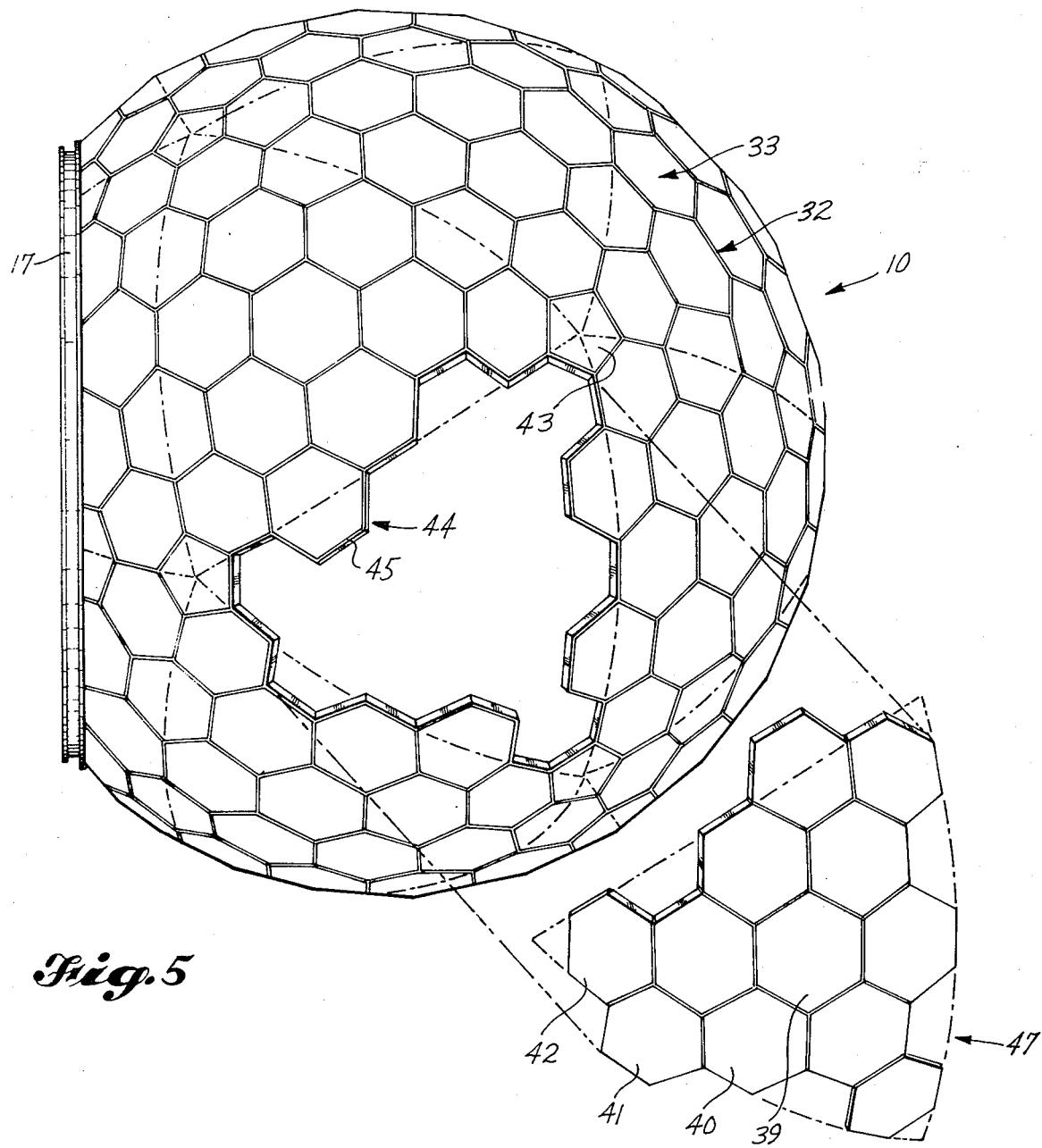
FIG. 5 is a partially explored view of the turbulence control structure showing the manner in which the structure may be disassembled for transporting.

Because some distortion is introduced into the geometric structure during projection of the vertices onto an imaginary sphere, not all of the hexagonal faces are regular geometric hexagons. Referring to FIG. 5 the geometric faces defined by the frame include true hexagons 39, each located at the center of an original triangular face of the regular icosahedron, modified hexagons 40, 41 and 42, and true pentagons 43, each pentagon 43 located at an original vertex of the regular icosahedron.

The resulting frame 32 is the closest to a spherical shape that can be achieved, given the total number of faces employed and the requirement that there be no more than three intersecting edge members at any vertex.

Fabrication of the turbulence control structure 10 consists first of fabrication of polygonal frame members 44 from strips of steel or aluminum plate. Each strip is bent into the required pentagonal or hexagonal shape and closed with a weld joint. The frame 32 is then assembled by securing the frame members 44 to one another edgewise, with rivets or other suitable means, to form the basic geodesic structure of the frame 32. Each pair of adjacent frame members 44 thus combine to form a single straight edge portion 45. The interior edge of each frame member 44 is chamferred such that when the frame members 44 are secured to one another their combined interior edges form a doubly tapered interior facing edge 46, as is illustrated in FIG. 4. This doubly tapered edge 46 minimizes turbulence created by the airflow around the straight edge portions 45. Fabrication is completed by installation of the panels 33 by bolting the upturned edges of the perforated sheets 34, along with the reinforcement strips 37, to the edge portions 45, as described above and illustrated in FIG. 4.

Because the entire turbulence control structure 10 is cantilevered from the vertical support shafts 24 and 25, greater stress bears on the area of the dome closest to the support shafts 24 and 25. To keep overall weight to a minimum and to keep the center of gravity near the base ring 17, the frame material was chosen as a function of the frame location in the dome. Polygonal frame members 44 nearest the base ring 17 are constructed of one-eighth inch stainless steel. Polygonal frame members 44 in the middle one-third of the structure 10 are constructed of one-eighth inch aluminum plate, and the frame members 44 in the forward third of the structure 10 are constructed of one-tenth inch aluminum plate.

By minimizing the weight and size of the frame members 44, and by using the means of fabrication described above, the total area of the dome surface occupied by the frame 32 is only 2.9% of the total spherical area of the turbulence control structure 10. This represents a significant improvement over previous turbulence control structures, wherein the total frame area was typically five percent or more of the total surface area.

The entire turbulence control structure 10 may be disassembled into structural units 47, as shown in FIG. 5. The size of these structural units 43 are such that they may be loaded and transported in commercial airplanes.

Although a single preferred embodiment of the invention is depicted and described, it is understood that additions, alterations and variations may be apparent to one skilled in the art and may be made without departing from the invention's fundamental theme. Further, although the invention has been described as being particularly applicable to turbofan jet engines, it is understood that usage is not limited to any specific machinery, and that the basic structure of the invention can be applied to other sound sources where air turbulence control is desired. Accordingly, the scope of the invention should be limited only by the scope of the following claims.

The embodiments of the invention in which an exclusive property or privilege is claimed are defined as follows:

1. In ground test apparatus for an aircraft jet engine, a device for attenuating steady and unsteady distortions in air entering the intake of an engine mounted therein comprising a substantially spherical enclosure of a diameter approximately three times the diameter of said engine air intake, the wall structure of said spherical enclosure comprising air-traversible flow straightening means, said enclosure having a substantially ciruclar side wall opening of a diameter larger than the engine exterior and was not materially larger than approximately the radius of said spherical enclosure, mounting means maintaining said engine approximately centered in said opening with its nozzle end outside said enclosure and its intake end extending along a horizontal axis and projecting radially into said enclosure by a distance that places said engine intake at a generally central location within said enclosure, and baffle means of annular form substantially bridging between said enclosure and said engine at a location back of said engine intake.

2. The device of claim 1 wherein said baffle means comprises a frustoconical panel converging forward and inwardly from the rim of said circular opening to an inner circular opening coaxially encircling said intake and spaced back from the highlight plane of said air intake of said jet engine.

3. The device of claim 2 wherein said frustoconical panel comprises a forward perforated sheet assembly and a backplate, and sound absorbent batting means enclosed between said backplate and said perforated sheet assembly.

4. The device of claim 1 wherein a highlight plane of said engine intake lies back of geometric center of said enclosure by a distance approximately one-half the radius of said engine intake.

5. The device of Claims 1, 2, 3 or 4 wherein the enclosure wall comprises a honeycomb panel adhesively bonded to a perforated sheet.

6. The device of claim 1 wherein the enclosure is formed by a polyhedral geodesic frame and the enclosure wall comprises a plurality of substantially flat air-traversible flow panels occupying the frame openings.

7. The device defined in claim 6 wherein said geodesic frame has the geometric structure of a modified 9-frequency icosahedron, said modified 9-frequency icosahedron being derived from a regular 9-frequency icosahedron by the substitution of a flat pentagonal face for each set of faces meeting at those vertices of a regular 9-frequency icosahedron wherein five edges intersect, and substitution of flat hexagonal faces for the hexagonal assemblages of triangular faces on a regular 9-frequency icosahedron, said modified icosahedron thereby having substantially no vertices at which more than three edges or faces intersect, said modified icosahedron thereby formed substantially entirely of pentagonal and hexagonal faces, said modified icosahedron being further derived by projecting the remaining vertices of said modified icosahedron onto the surface of an ideal sphere and adjusting the dimensions of said pentagonal and hexagonal faces accordingly.

8. The device of claim 6 wherein said geodesic frame comprises a plurality of polygonal frame members, each of said frame members including an elongated rigid sheet material strip bent into a predetermined polygonal shape with the ends of said strip joined together, said strips having a width substantially equal to the thickness of said flow panels, said frame members being assembled together with mutually adjacent sides interconnected to form said geodesic frame.

9. The device of claim 8 wherein the edges of said strips interior to the enclosure are tapered in thickness by chamfering of the side of each opposite that of the adjacent strip connected thereto, whereby the interconnected strips form a doubly tapered interior edge.

10. The device of claim 8 wherein said frame members more removed from said circular opening are lighter than frame members nearer thereto.

11. The device of claims 8, 9 or 10 wherein each of said flow panels comprises a honeycomb panel adhesively bonded to a perforated sheet, each of said perforated sheets having a flanged peripheral edge fixedly secured to said geodesic frame with said sheet on the exterior of the enclosure.

12. The device of claim 6 further comprising a movable support means, said support means including a pair of support shafts, said support means including a mobile carriage, said mobile carriage having a flat horizontal upper surface, said support shafts extending upward from said upper surface of said mobile carriage, said geodesic frame secured to said support shafts at said substantially circular opening, said support shafts being substantially coplanar with one another and with said substantially circular opening.

* * * * *